United States Patent [19]

Ban et al.

[11] 4,382,214

[45] May 3, 1983

[54] DIRECT CURRENT MOTOR

[76] Inventors: Itsuki Ban, 829 Higashi Oizumimachi, Nerima-ku, Tokyo; Manabu Shiraki, 4451-171 Shimotsuruma, Yamatoshi, Kanagawaken, both of Japan

[21] Appl. No.: 204,914

[22] Filed: Nov. 7, 1980

[30] Foreign Application Priority Data

Nov. 13, 1979 [JP] Japan ............................ 54-146059

[51] Int. Cl.³ .......................................... H02K 29/00
[52] U.S. Cl. .................................... 318/254; 318/318
[58] Field of Search ............... 310/198, 202; 318/138, 318/254, 439

[56] References Cited

U.S. PATENT DOCUMENTS 3,733,506  5/1973  Jaffe et al. .......................... 310/198
4,107,587  8/1978  Ban et al. ............................ 318/439

Primary Examiner—David Smith, Jr.
Assistant Examiner—Saul M. Bergmann
Attorney, Agent, or Firm—Kenway & Jenney

[57] ABSTRACT

A direct current motor comprising the field magnet pole of a permanent magnet and an armature having a plurality of armature windings. The field magnet pole has at least four magnetic poles and the angular spacing is equal to 360 degrees divided by the number of the magnetic poles, and at least one of the armature windings has an angular spacing which is (2n - 1) times the width of the field magnet pole, where n is a positive integer of 2 or more, and control means for successive switching, rendering said armature windings conductive, is provided.

4 Claims, 9 Drawing Figures

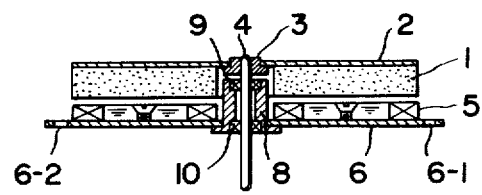
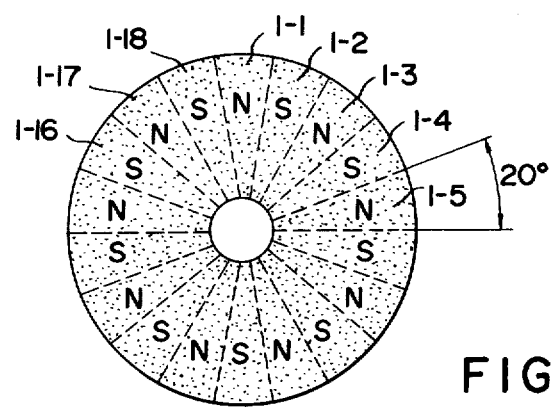
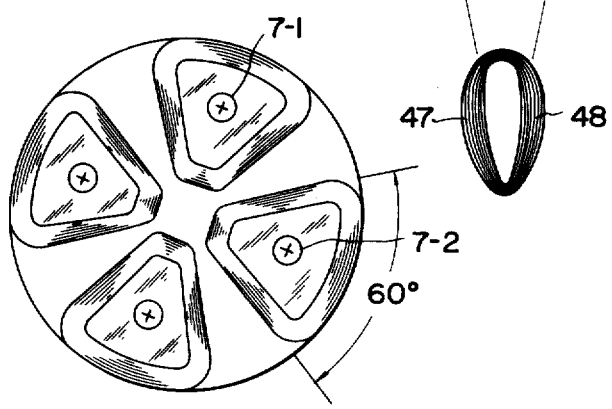

DIRECT CURRENT MOTOR

BACKGROUND OF THE INVENTION

The present invention relates to a direct current motor and more particularly to a direct current motor provided with armature windings with a specific angular space.

Recently, various types of direct current motors have been proposed. Most of them employ lap windings or wave windings, and, in other improved direct current motors, only part of the lap windings or the wave windings has been improved, and they have various drawbacks including that the wow and flutter characteristics are poor (U.S. Pat. Nos. 4,107,587 and 4,227,107).

SUMMARY OF THE INVENTION

The above-described drawbacks in the prior art direct current motors have been successfully eliminated by the present invention.

An object of the present invention is to provide a direct current motor with armature windings whose construction is free from the conventional principles of lap windings and wave windings.

Another object of the present invention is to provide a direct current motor of the type described, with high torque ripple frequencies and less mechanical and electrical noise in comparison with the conventional direct current motors.

According to the present invention, in order to attain these objects, in a direct current motor with an armature having a plurality of armature windings, which is rotatable relative to the field magnet poles of a permanent magnet, the number of the field magnet poles is four or more and the angular space is equal to 360° divided by the number of magnetic poles, and at least one of the armature windings has an angular space which is $(2n-1)$ times the width of the field magnet poles, where n is a positive integer of 2 or more. The direct current motor according to the present invention is further provided with control means for successive switching, rendering the armature windings conductive.

These and other objects of the invention will become apparent from the following description of embodiments thereof when taken together with the drawings.

BRIEF DESCRIPTION OF THE DRAWINGS

In the drawings,

FIG. 1 is a cross section of a semi-conductor motor according to the present invention.

FIG. 4 is a front view of the magnet rotor shown in FIG. 3.

FIG. 5 is a view showing arrangement of the armature windings in FIG. 3.

FIG. 6 is a front view of a conventional armature winding.

DETAILED DESCRIPTION OF THE PREFERRED EMBODIMENTS

Figure 2:
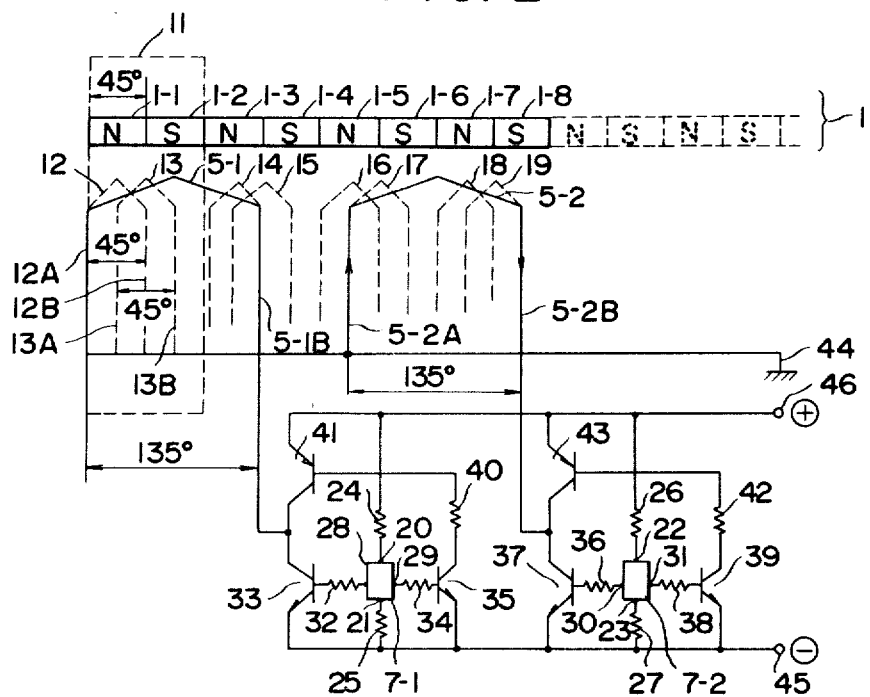
FIG. 2 is a developed view of the magnet rotor and and armature windings of a two-phase semi-conductor motor according to the present invention.

Referring to FIG. 1, there is shown a cross section of a semi-conductor motor according to the present invention. Reference numeral 1 represents a magnet rotor, which is fixed to a rotating disc 2 by an adhesive. The rotating disc 2 serves as a support member for supporting the magnet rotor 1 which constitutes a field magnet pole and to close the magnetic path of the magnet rotor 1. By press-fitting a boss 3 into the central portion of the rotating disc 2 and also press-fitting a rotating shaft 4 into the central portion of the boss 3, the magnet rotor 1, the rotating disc 2, the boss 3 and the shaft 4 are united integrally. Armature windings 5 are disposed so as to face the magnet rotor 1 and are fixed to the upper surface of a bottom plate 6 by an adhesive. In the outer peripheral portion of the bottom plate 6, there are formed holes 6-1 and 6-2 through which the bottom plate 6 may be mounted on a support (not shown). A boss 8 is press-fitted into the central portion of the bottom plate 6, and the boss 8 is provided with bearings 9 and 10. The bearings 9 and 10 are made of a oil-less metal, each having an opening portion in the central portion thereof, whereby the rotating shaft 5 can be passed through the bearings 9 and 10, and the magnet rotor 1, the rotating disc 2, the boss 3 and the shaft 4 can be rotatably supported.

Referring to FIG. 2, there is shown a developed view of an example of the magnetic rotor 1 and the armature windings 5 which constitute the essential portions of the D.C. motor according to the present invention. A motor which is constructed of two magnetic poles 1-1 and 1-2 which are encircled by the dotted line 11, and armature windings 12 and 13 indicated by the dotted lines in the figure, is a conventional two-phase motor. The armature windings 12 and 13 are superimposed on each other. The angular spacing of each of the armature windings 12 and 13 is the same as that of the magnet rotors 1-1 and 1-2 which constitute the field magnet poles. Therefore, when the magnet rotor 1 has 8 magnetic poles, the angular spacing of one pole is 45 degrees, so that the angular spacing of the armature windings is also 45 degrees (360°/8=45°). Furthermore, these armature windings are superimposed in double layers. As the number of poles of the magnet rotor increases, the angular spacing of the armature windings has to be decreased, so that production of such armature windings is difficult in practice. In particular, if the armature windings have to be superimposed on each other, producing such armature windings will become more difficult.

Therefore, according to the present invention, the angular spacing of the armature windings can be set in an easy manner for production thereof without superimposing the armature windings. Specifically, an armature winding fraction 12B is phase-shifted at the in-phase position of the magnet rotor 1, so that the armature winding fraction 12B is located at a position 5-1B. Furthermore, an armature winding fraction 13A of an armature winding 13 is phase-shifted at the in-phase position of the magnet rotor 1, so that the armature winding fraction 13A is located at a position 5-2A. An armature winding fraction 13B is also phase-shifted at the in-phase position of the magnet rotor 1, so that the armature winding fraction 13B is located at a position 5-2B. Thus, the armature windings 5-1 and 5-2 are capable of performing exactly the same function as that of the armature windings 12 and 13. The angular spacing of each of the armature winding 5-1 and 5-2 is 135 degrees, which is three times the angular spacing of each of the armature windings 12 and 13 (i.e., $2n-1=3$, when $n=2$). In this case, both the armature windings are phase-shifted to treble the angular spacing. However, the angular spacing can be trebled by phase-shifting either of the armature windings 12 or 13.

Another method of accomplishing the present invention will now be explained.

If the armature windings are arranged with respect to a magnet rotor having 8 magnetic poles in the conventional manner as shown in FIG. 2, armature windings 12, 13, 14, 15, 16, 17, 18 and 19 and at least 8 double windings are required. In one end of the armature winding 12 and in the opposite end of the armature winding 14, the phase of the current which flows through them is the same, but the direction of the flow of the current is opposite. Therefore, one armature winding 5-1 is formed by connecting the armature windings 12 and 14 to each other. Likewise, in one end of armature winding 17 and in the opposite end of the armature winding 19, the phase of the current which flows through them is the same, but the direction of the flow of the current is opposite. Therefore, another armature winding 5-2 is formed by connecting the armatures 17 and 19 to each other. Since the armature windings 13, 15, 17 and 19 are shifted by 90 degrees of electrical angle relative to the armature windings 12, 14, 16 and 18, the armature winding 5-1, which is prepared by synthesizing the armature winding 12 and the armature winding 14, is shifted by 90 degrees of electrical angle relative to the armature winding 5-2 which is prepared by synthesizing the armature winding 17 and the armature winding 19.

Figure 2A:
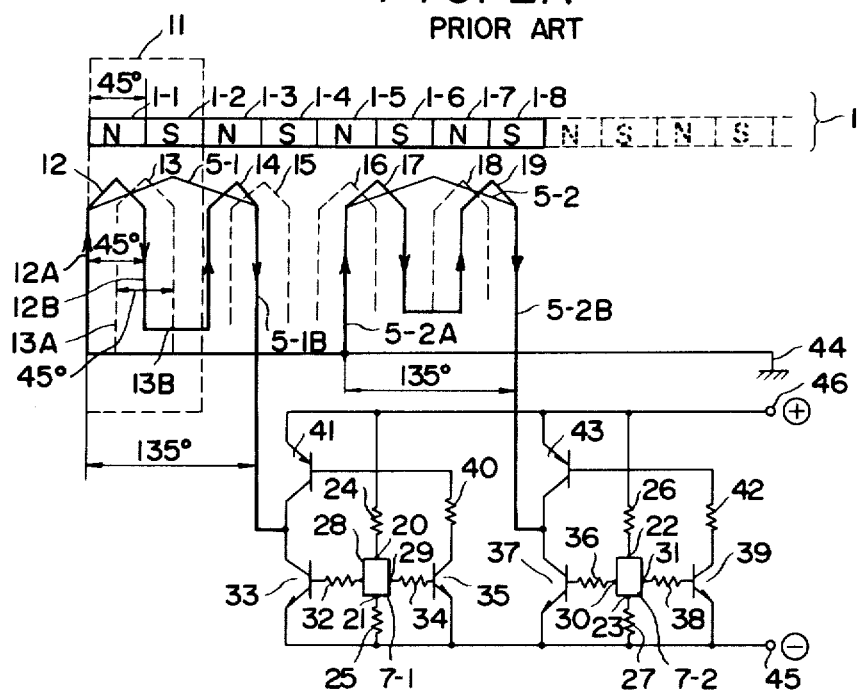
FIG. 2A is a developed view of a prior art magnet rotor and armature windings indicating current directions.

FIG. 2A is a view similar to FIG. 2 in which it is emphasized that the angular spacing of each of the armature windings, for example, winding fractions 12A and 12B, is the same as that of each of the field magnet poles 1-1. Torques produced at the fractions 12A and 12B are in the same direction because the polarities of the magnetic poles facing the winding fractions are in opposite directions. Under Fleming's left-hand rule, rotation of the motor is thus achieved.

Position sensors 7-1 and 7-2 are Hall devices. A voltage is applied to the voltage-applying terminals 20, 21, 22 and 23 of the Hall devices through resistors 24, 25, 26 and 27. One output terminal 28 of the Hall device 7-1 is connected to the base of a transistor 33 through a resistor 32, while the other output terminal 29 of the Hall device 7-1 is connected to the base of a transistor 35 through a resistor 34. One output terminal 30 of the Hall device 7-2 is connected to the base of a transistor 37 through a resistor 36, while the other output terminal 31 of the Hall device 7-2 is connected to the base of a transistor 39 through a resistor 38. A collector of the transistor 35 is connected to the base of a transistor 41 through a resistor 40. A collector of the transistor 39 is connected to the base of a transistor 43 through a resistor 42.

Therefore, when output signals are generated at the output terminal 28 of the Hall device 7-1 and at the output terminal 30 of the Hall device 7-2, the transistors 33 and 37 are energized (ON), and an electric current flows from a grounded power source 44 to a negative power source 45 through the armature windings 5-1 and 5-2. On the other hand, when output signals are generated at the output terminal 29 of the Hall device 7-1 and at the output terminal 31 of the Hall device 7-2, the transistors 35 and 39 are energized (ON), and, accordingly, the transistors 41 and 43 are also energized (ON), so that the electric current flows from a positive power source 46 to the grounded power source 44 through the armature windings 5-1 and 5-2. This conduction switching is performed successively with a phase difference of 90 degrees of electric angle. Therefore, the magnet rotor is rotated, generating torque. In the state shown in FIG. 2, an output signal is generated at the output terminal 30 of the Hall device 7-2, so that the transistor 37 is energized (ON) through the resistor 36, and the electric current flows from the grounded power source 44 to the armature winding 5-2 in the direction of the arrow, so that the magnet rotor is rotated, generating torque.

This embodiment has been explained by use of the transistors. However, it is apparent that other semi-conductor switching elements can be employed in place of the transistors. The same thing applies to other embodiments according to the present invention, which will be mentioned hereinafter.

Figure 3:
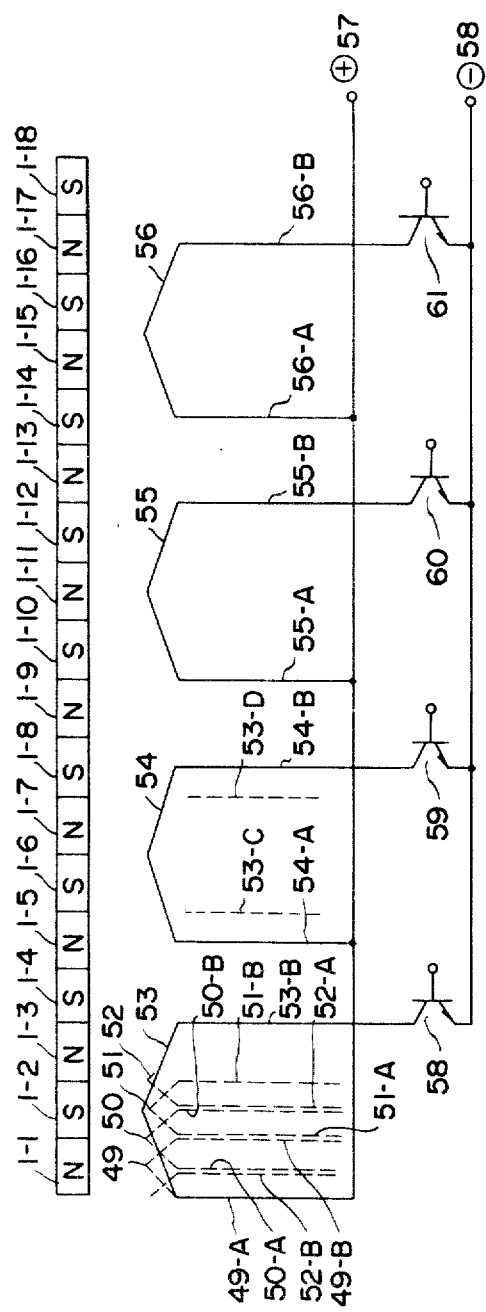
FIG. 3 is a developed view of the magnet rotor and armature windings of a four-phase semi-conductor motor according to the present invention.

Referring to FIG. 3, a further embodiment of a D.C. motor according to the present invention will now be explained. The main differences between the motor in FIG. 2 and the motor in FIG. 3 are that, in the motor in FIG. 3, the number of poles of the magnet rotor is greater, and further that, in the motor in FIG. 2, the armature windings are rendered conductive reciprocatively by use of a two-power source system, while, in the motor in FIG. 3, one-way conduction is performed by use of a four-armature-windings system. The specific reasons for those differences will now be explained.

When a D.C. motor is employed for driving a direct turntable or for direct driving of cassette tapes, the wow and flutter characteristics are greatly affected by the cogging and torque ripples of the D.C. motor itself. The cogging can be avoided by making the motor coreless. The simplest and least expensive way to avoid the torque ripples is to absorb the high frequency torque ripples by mechanical inertia by increasing the switching frequency as much as possible. Therefore, in this embodiment, in comparison with the motor in FIG. 2, the number of magnetic poles is increased to 18 in FIG. 3. In fact when making the motor in practice, the number of magnetic poles was further increased to 60. However, since it is difficult to make a drawing of the circuits in that case, in the embodiment shown in FIG. 3 the number of magnetic poles is 18.

Referring to FIG. 4, there is shown the magnetization of the magnet rotor 1. As can be seen from the figure, the angular spacing of the magnetization of one magnetic pole is 20 degrees (360°/18). According to a conventional arrangement of armature windings, double layered armature windings are arranged with 20 degrees of angular spacing as shown in FIG. 6. As mentioned previously, in this embodiment the number of magnetic poles is 18 since the illustration of a magnet rotor having more than 18 magnets is very difficult. As a result, the angular spacing of each of the armature windings is 20 degrees, so that each armature winding appears to be in a fan shape and conventional winding can be easily done. However, in the case where the magnet rotor has 60 magnetic poles and the angular spacing is 6 degrees, the winding may be done as if it is done around an almost rectangular member and, actually, when such coiling is done, the portions indicated by reference numerals 47 and 48 in FIG. 6 bulge out, deviating from an ideal shape. Further, it is impossible to make an ideal arrangement of those improperly shaped armature windings. Therefore, formation of the armature windings in a shape for performing winding easily, by increasing the angular spacing thereof, and a simple arrangement method for the armature windings, are desired.

The angular spacing of the armature windings in the case where the magnet rotor has 18 magnetic poles as shown in FIG. 3 will now be explained. When winding is performed in a conventional armature winding procedure, the armature windings are superimposed in double layers as indicated by the dotted lines 49 and 52 and the magnet rotor 1 is rotated as a four-phase semi-conductor motor. Here attention is paid to the armature winding fractions 49-A, 49-B, 50-A, 50-B, 51-A, 51-B, 52-A and 52-B which generate torque of the armature winding 49 and 52. The armature fractions 49-A to 52-B generate torque in the same direction, even if they are shifted to an in-phase position with respect to the magnet rotor 1, so long as the current flow direction is the same. Therefore, an armature winding 53 can be made by shifting the armature winding fraction 49-B to a position indicated by reference numeral 53-B and by connecting the armature winding fraction 49-B to the armature winding fraction 49-A. Thus, an armature winding having an angular space which is three times the angular space of the armature winding 49 (i.e., $2n-1=3$, when $n=2$) is achieved. As a matter of course, the armature winding fraction 49-B can be shifted to 53-C and to 53-D. In this case, the armature windings whose angular spaces are an odd number of times the angular space of the armature winding 49, such as 5 times ($2n-1=5$, when $n=3$) or 7 times ($2n-1=7$, when $n=4$), can be successively obtained.

As in the case where the armature winding fraction 49-B is shifted, the armature winding fraction 50-A is shifted to a position indicated by reference numeral 54-A, and the armature windinng fraction 50-B to a position indicated by reference numeral 54-B, whereby an armature winding 54 can be obtained.

Furthermore, by shifting the armature winding fraction 51-A to a position indicated by reference numeral 55-A, and the armature winding fraction 51-B to a position indicated by reference numeral 55-B, an armature winding 55 can be obtained. Furthermore, by shifting the armature winding fraction 52-A to a position indicated by reference numeral 56-A, and the armature winding fraction 52-B to a position indicated by reference numeral 56-B, an armature winding 56 can be obtained.

The thus obtained armature windings 53 to 56 can be rendered conductive by four-phase conduction in exactly the same manner as in the case where the armature windings 49 to 52 are employed. Therefore, one terminal of each of the armature windings 53 to 56 is connected to a positive power source terminal 57, and the other terminals of the armature windings 53 to 56 are respectively connected to the collectors of the transistors 58 to 61, while the emitters of the transistors 58 to 61 are connected to a negative power source terminal 58. As mentioned previously, the transistors 58 to 61 are for controlling the four-phase conduction. In the arrangement of the armature windings shown in FIG. 3, a hole is formed in the central portion of a winding frame for the armature windings, since the angular space of the armature windings is increased, so that the armature windings are secured to the bottom plate 6 shown in FIG. 1 by screws through the hole. According to this method, the armature windings can be easily arranged properly, so long as the accuracy of the above-mentioned members is high. Further, the angular spaces of the armature windings can be made large. Consequently, an ideal arrangement of the armature windings can be accomplished almost in an ideal shape.

In the case where the armature windings can be disposed by regulating their positions in a well known way, without employing the winding frame, the position sensors, such as Hall devices, or the one chip semiconductor switching elements, can be secured to the holes of the armature windings.

The advantages of the present invention will now be further explained. The angular spaces of the armature windings that can be actually wound range from about 30 degrees to 90 degrees. Therefore, in the conventional magnet rotor which is in conformity with the above-mentioned angular spaces, the maximum number of magnetic poles is 12. In such a magnet rotor, if the electric current which flows through the armature windings is switched by the conventional switching method, torque ripples take place due to the low switching frequency, and such torque ripples cannot be eliminated by mechanical inertia. As a result, the wow and flutter characteristics are considerably degraded. In order to prevent this, the current curve of the electric current which flows through the armature windings is controlled so as to reduce the torque ripples, thereby improving the wow and flutter characteristics. Therefore, motors for use with acoustic apparatus, such as direct-drive turntables, are very expensive due to the above-mentioned control problems.

However, according to the present invention, the angular spaces of the armature windings can be increased as shown in FIG. 5 and the number of magnetic poles of the magnet rotor 1 can be increased significantly. For example, as mentioned previously, the number of the magnetic poles of the magnet rotor 1 can be increased to 60, and the angular space of the armature windings can be made $6 \times (2n-1)$ degrees, where n is a positive integer of 2 or more. Therefore, although the waveform of the current which flows through the armature windings is in the shape of square waves, the frequency of the torque ripples is so high that the torque ripples can be absorbed by the mechanical intertia. As a result, according to the present invention, the advantage of remarkably improving the wow and flutter characteristics can be achieved successfully.

Conventionally, in order to increase the rotation accuracy of the magnet rotor, a feed-back mechanism is employed for the control of the rotation of the magnet rotor. However, according to the present invention, a motor having excellent wow and flutter characteristics can be obtained even if the motor is rotated in a similar rotation principle to that of a synchronization motor by applying an input with a pretermined frequency to the motor. Furthermore, the motor according to the present invention has advantages with respect to production efficiency over the prior-art motors.

The present invention is not limited to two-phase and four-phase motors, but it can be applicable to three-phase and other motors.

Figure 7:
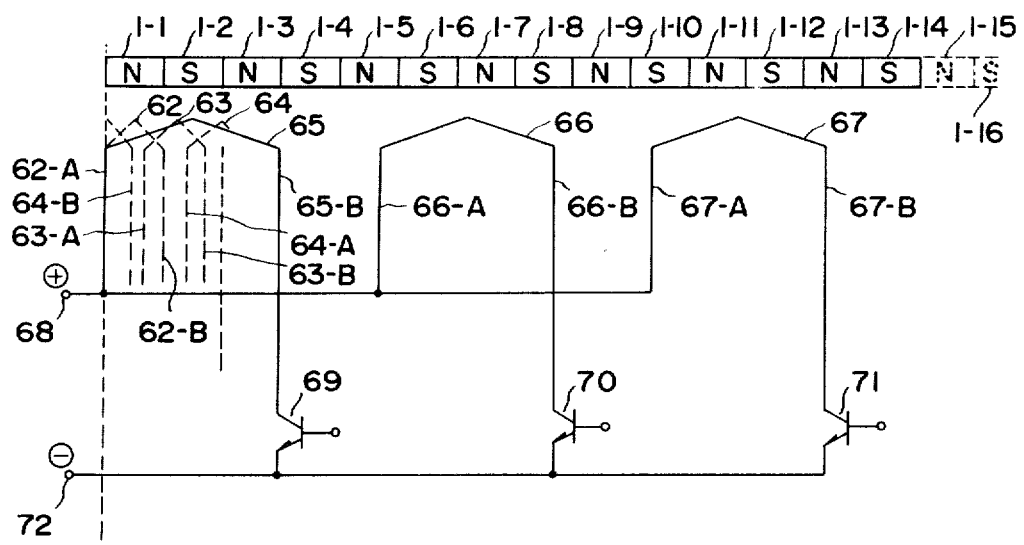
FIG. 7 is a developed view of the magnet rotor and armature windings of a three-phase semi-conductor motor according to the present invention.

Referring to FIG. 7, a further embodiment of a D.C. motor according to the present invention, which is a three-phase motor, will now be explained. In the three-phase motor, the angular space of the field magnets is 360°/14÷25.7°. When the three-phase winding is performed in accordance with the conventional lap winding procedure, the armature windings are superimposed on each other as indicated by the broken lines in FIG. 7, and the angular space of the armature is limited to 360°/14 degrees. In contrast to this, in the present invention, an armature winding fraction 62-B of an armature winding 62 is shifted to the magnetic field of the magnet rotor 1 and located at a position indicated by reference numeral 65-B, and an armature winding fraction 62-A is connected to an armature winding fraction 65-B, so that an armature winding 65 is obtained. An armature winding fraction 63-A of the armature winding 63 is shifted to a position indicated by reference numeral 66-A, and an armature winding fraction 63-B is shifted to a position indicated by reference numeral 66-B and an armature winding fraction 66-A and an armature winding fraction 66-B are connected to each other, so that an armature winding 66 is obtained. Furthermore, an armature winding fraction 66-A of an armature winding 64 is shifted to a position indicated by reference numeral 67-A, and an armature winding fraction 64-B is shifted to a position indicated by reference numeral 67-B, and an armature winding fraction 67-A and an armature winding fraction 67-B are connected to each other, so that an armature winding 67 is obtained. The angular space of each of the armature windings 65, 66 and 67 is three times the angular space of each of the armature windings 62, 63 and 64 (i.e., 2n−1=3, when n=2). One end of each of the armature windings 65 to 67 is connected to a positive power source 68, while the other ends of the armature windings 65 to 67 are respectively connected to the collectors of transistors 69 and 71. The emitters of the transistors 69 and 71 are connected to a negative power source 72. The thus connected armature windings 65 to 67 are rendered conductive exactly in the same order as in the case of the armature windings 62 to 64. The phase shifting of all the armature windings is not necessarily required. Furthermore, it is not always necessary to dispose uniformly the phase-shifted armature windings. Therefore, the number of the magnetic poles can be increased as in the position indicated by broken lines such as 1-14 and 1-15 for increasing the torque ripple frequencies, thereby improving the wow and flutter characteristics.

Figure 8:
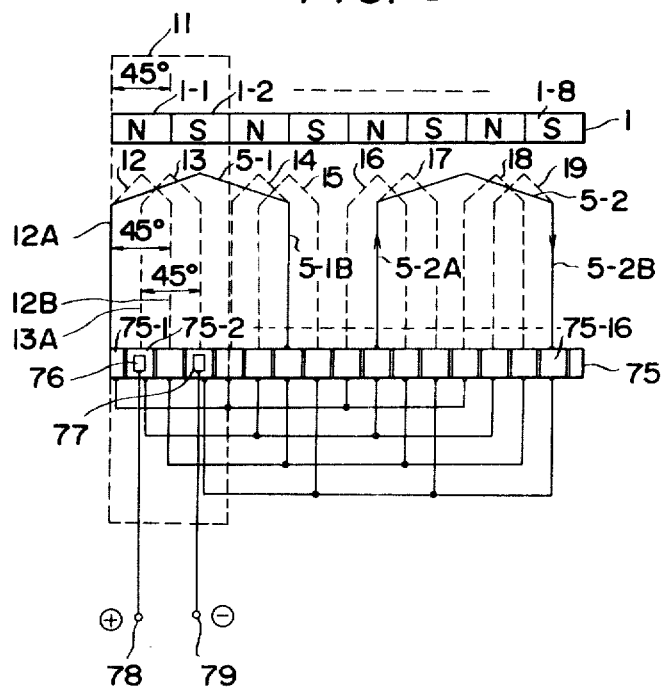
FIG. 8 is a developed view of the field magnet poles and armature windings of a two-phase commutator motor according to the present invention.

In all the so far explained embodiments, the present invention is applied to semi-conductor motors in which a magnet rotor constituting field magnetic poles is rotated. However, the present invention can be applied to a commutator motor employing a commutator and a brush for rendering each armature winding and, a stator constituting a field magnet pole. Referring to FIG. 8, there is shown an example of such a commutator motor. The magnet rotor and and armature windings for the motor will now be explained by referring to those shown in FIG. 2. The reference numerals common to FIG. 2 and FIG. 8 indicate substantially the same members having the same functions. Reference numeral 75 represents a commutator comprising commutator bars 75-1, 75-2, ..., 75-16. Reference numerals 76 and 77 represent brushes to which an electric current is supplied from positive and negative D.C. power sources 78 and 79. The brushes 76 and 77 are in sliding contact with the commutator bars 75-1, 75-2, ..., 75-16, so that each armature winding is rendered conductive. The commutator bars 75-1, 75-5, 75-9 and 75-13 are electrically connected to each other by a conductive member. Likewise, the commutator bars 75-2, 75-6, 75-10 and 75-14 are connected to each other, the commutator bars 75-3, 75-7, 75-11, 75-15 are connected to each other and the commutator bars 75-4, 75-8, 75-12 and 75-16 are connected to each other, by conductive members. In the arrangement shown in FIG. 8, electric current flows through the armature winding 5-2 in the direction of the arrow, generating torque, so that each armature winding and the commutator 75 are rotated. The present invention can be applied to any other commutator motors.

Furthermore, in the so far mentioned embodiments, the armature windings of a flat type are employed. However, the present invention can be applied to cylindrical type armature windings and to core type armatures.

Thus, there is provided in accordance with the invention a D.C. motor which has the advantage discussed above. The embodiments described are intended to be merely exemplary and those skilled in the art will be able to make variations and modifications in them without departing from the spirit and scope of the invention. All such modifications and variations are contemplated as falling within the scope of the claims.

What is claimed is:

1. In a direct current motor comprising a field magnet having multiple magnetic poles and an armature having a plurality of armature windings, the improvement wherein said field magnet has at least four magnetic poles and the angular spacing is equal to 360 degrees divided by the number of the magnetic poles, and at least one of said armature windings has an angular spacing which is (2n−1) times the width of said field magnetic pole, where n is a positive integer of 2 or more, and control means for successive switching, rendering said armature windings conductive, is provided.

2. A direct current motor as claimed in claim 1, wherein said armature windings are disposed so as not to be superimposed on each other and constitute a coreless armature.

3. A direct current motor as claimed in claim 1, wherein said control means comprises position sensors for sensing the rotating position of a magnet rotor, and a semi-conductor switching device for controlling the current which flows through an armature through a detection output from said position sensors.

4. A direct current motor as claimed in claim 1, wherein, in said control means, the terminals of said armature windings are connected to predetermined commutator bars, and an electric current is supplied to a commutator comprising a plurality of commutator bars and to said armature windings from positive and negative D.C. power sources through brushes which are in sliding contact with said commutator bars.

* * * * *